United States Patent
Conrad et al.

(10) Patent No.: US 11,198,085 B2
(45) Date of Patent: Dec. 14, 2021

(54) FILTER APPARATUS FOR A SURFACE CLEANING APPARATUS

(71) Applicant: Omachron Intellectual Property Inc., Hampton (CA)

(72) Inventors: Wayne Ernest Conrad, Hampton (CA); Gordon James Howes, Sozhou (CN); Wenxiu Gao, Suzhou (CN)

(73) Assignee: Omachron Intellectual Property Inc., Hampton (CA)

( * ) Notice: Subject to any disclaimer, the term of this patent is extended or adjusted under 35 U.S.C. 154(b) by 606 days.

(21) Appl. No.: 15/692,688

(22) Filed: Aug. 31, 2017

(65) Prior Publication Data

US 2019/0060812 A1 Feb. 28, 2019

(51) Int. Cl.
| | |
|---|---|
| *B01D 53/02* | (2006.01) |
| *B01D 46/00* | (2006.01) |
| *B01D 45/16* | (2006.01) |
| *B01D 46/24* | (2006.01) |
| *A47L 9/16* | (2006.01) |
| *A47L 9/12* | (2006.01) |
| *B01D 50/00* | (2006.01) |
| *A47L 5/24* | (2006.01) |

(52) U.S. Cl.
CPC ............ *B01D 46/0023* (2013.01); *A47L 5/24* (2013.01); *A47L 9/127* (2013.01); *A47L 9/1666* (2013.01); *B01D 45/16* (2013.01); *B01D 46/0024* (2013.01); *B01D 46/0097* (2013.01); *B01D 46/24* (2013.01); *B01D 46/2403* (2013.01); *B01D 50/002* (2013.01); *B01D 2267/40* (2013.01); *B01D 2273/28* (2013.01); *B01D 2279/55* (2013.01)

(58) Field of Classification Search
CPC .......... A47L 5/24; A47L 9/127; A47L 9/1666; B01D 2267/40; B01D 2273/28; B01D 2279/55; B01D 45/16; B01D 46/0023; B01D 46/0024; B01D 46/0097; B01D 46/24; B01D 46/2403; B01D 50/002
See application file for complete search history.

(56) References Cited

U.S. PATENT DOCUMENTS

| 5,259,854 | A | 11/1993 | Newman | |
|---|---|---|---|---|
| 6,003,196 | A * | 12/1999 | Wright | ...................... A47L 5/28 |
| | | | | 15/347 |
| 6,110,248 | A | 8/2000 | Liu | |
| 6,857,164 | B2 * | 2/2005 | Bair | ......................... A47L 5/28 |
| | | | | 15/347 |
| 6,895,632 | B2 | 5/2005 | Murray | |
| 6,944,909 | B2 | 9/2005 | Bair et al. | |

(Continued)

*Primary Examiner* — Christopher P Jones
(74) *Attorney, Agent, or Firm* — Philip C. Mendes da Costa; Bereskin & Parr LLP/S.E.N.C.R.L., s.r.l.

(57) ABSTRACT

A surface cleaning apparatus having an air flow path from a dirty air inlet to a clean air outlet and including an air treatment member, a suction motor and a filter assembly in the air flow path. The filter assembly includes at least two spaced apart physical filter elements with the upstream face of the second filter facing the downstream face of the first filter element. The filter assembly is configured to prevent air from bypassing the first physical filter media. The filter assembly includes a gap between the first filter element and the second filter element that acts as a header and reduces the flow rate of air incident on the second filter element.

20 Claims, 16 Drawing Sheets

(56) References Cited

U.S. PATENT DOCUMENTS

| | | | |
|---|---|---|---|
| 7,114,216 B2* | 10/2006 | Stephens | A47L 5/28 |
| | | | 15/326 |
| 7,144,438 B2 | 12/2006 | Lee et al. | |
| RE40,542 E | 10/2008 | Coburn et al. | |
| 7,845,046 B2 | 12/2010 | Milligan et al. | |
| RE43,603 E | 8/2012 | Coburn et al. | |
| 8,308,831 B2 | 11/2012 | Coburn | |
| 8,486,170 B2 | 7/2013 | Conrad et al. | |
| 8,887,349 B2* | 11/2014 | Lee | A47L 5/362 |
| | | | 15/327.1 |
| 2004/0163368 A1* | 8/2004 | Lee | A47L 9/122 |
| | | | 55/429 |
| 2005/0138762 A1 | 6/2005 | West | |
| 2005/0160554 A1* | 7/2005 | Ueyama | A47L 9/1608 |
| | | | 15/353 |
| 2006/0230720 A1 | 10/2006 | Han et al. | |
| 2010/0242421 A1* | 9/2010 | Conrad | A47L 9/122 |
| | | | 55/309 |
| 2011/0146024 A1* | 6/2011 | Conrad | A47L 5/24 |
| | | | 15/347 |
| 2017/0361261 A1* | 12/2017 | Panni | B01D 46/2414 |

\* cited by examiner

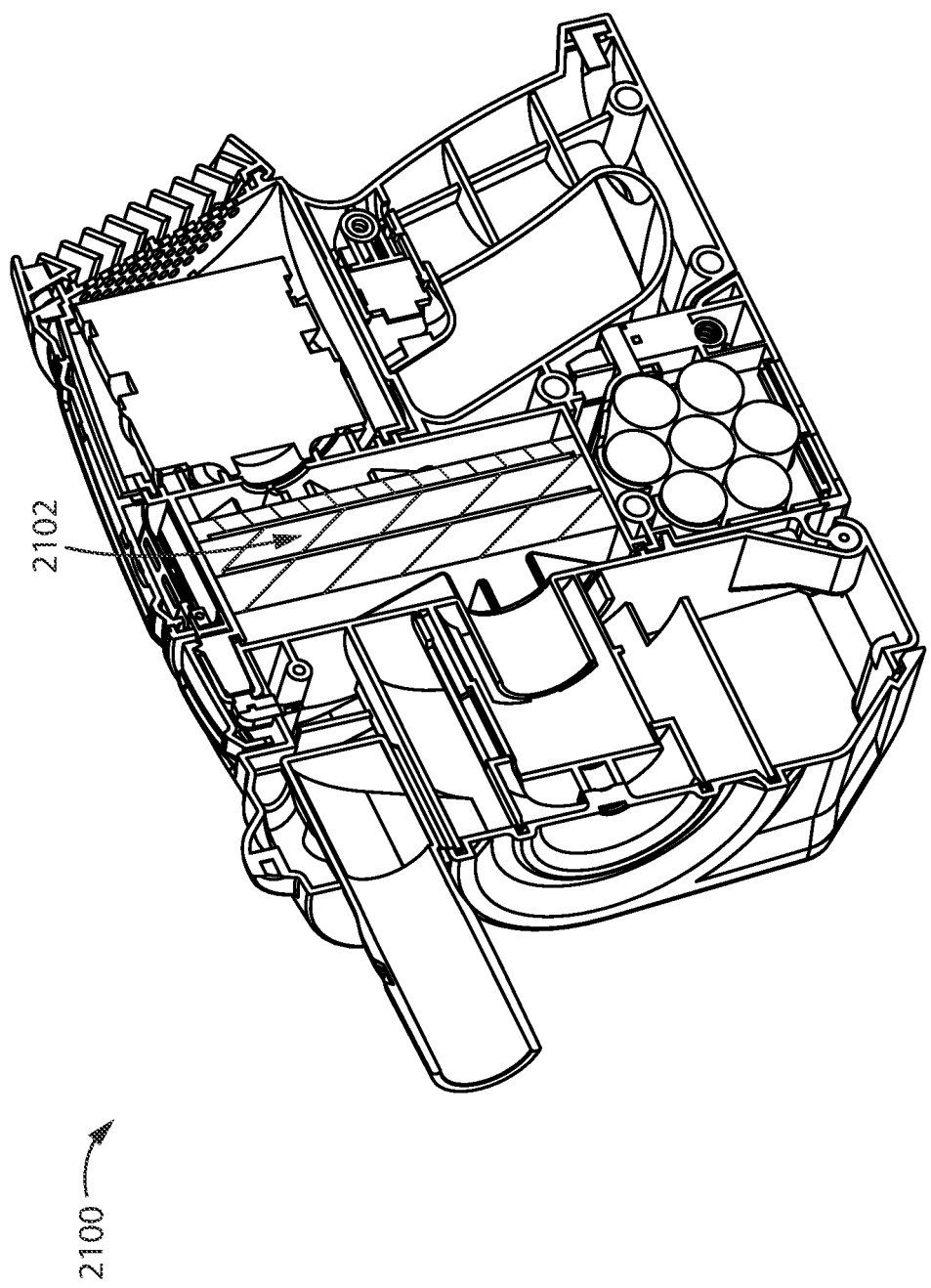

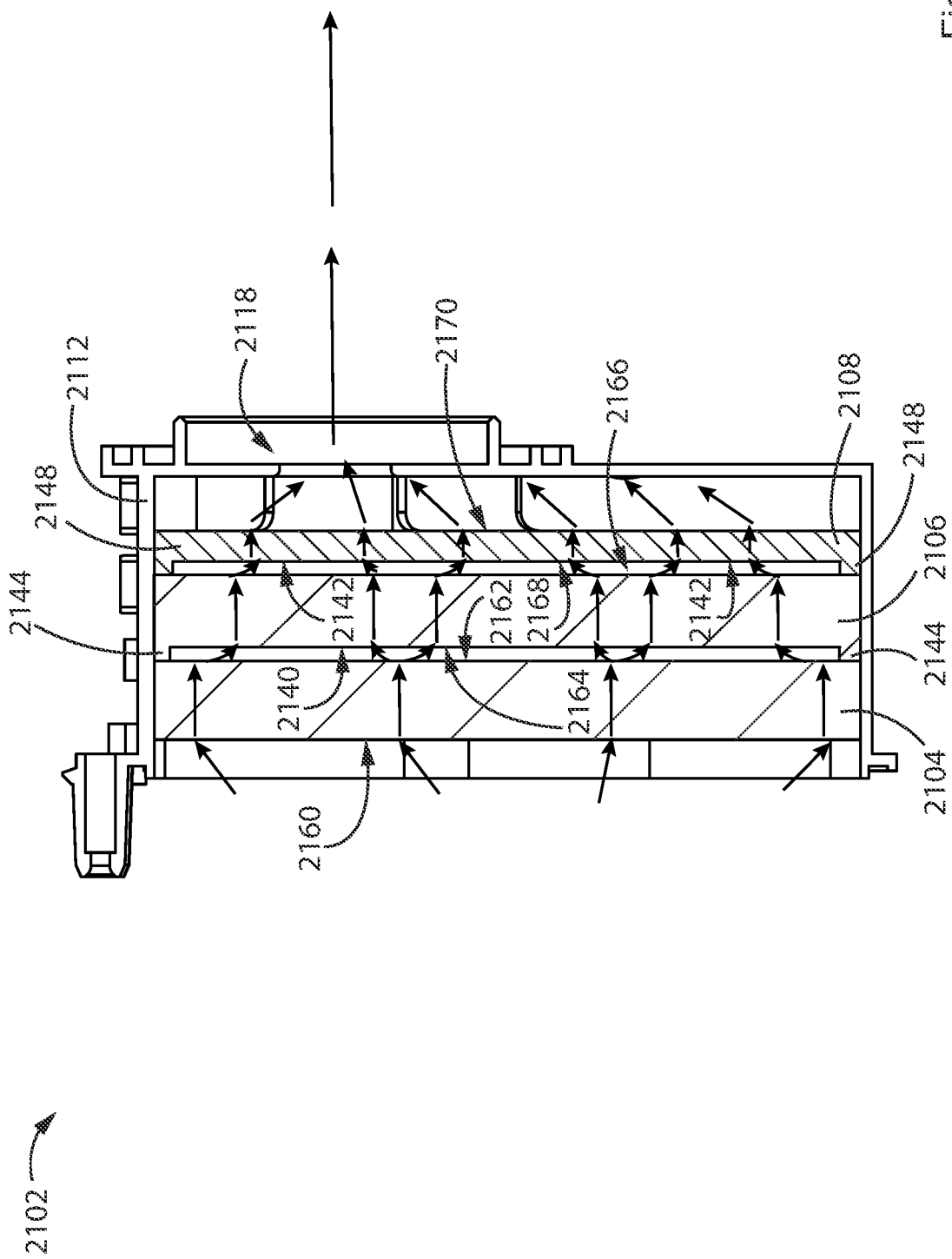

FILTER APPARATUS FOR A SURFACE CLEANING APPARATUS

FIELD

This disclosure relates generally to filter apparatuses for a surface cleaning apparatus. More particularly, this application relates to filter apparatuses having at least two spaced apart layers.

INTRODUCTION

The following is not an admission that anything discussed below is part of the prior art or part of the common general knowledge of a person skilled in the art.

U.S. Pat. No. 8,486,170 (Conrad et al.) discloses a filter apparatus that comprises first and second filters, each having an upstream surface and a downstream surface. The first filter is positioned upstream of the second filter. At least one bypass channel extends from a position upstream of the upstream surface of the first filter to a position upstream of the upstream surface of the second filter. Accordingly, as the first filter becomes clogged and, therefore, a greater back-pressure develops across the first filter, more air may bypass the first filter by means of the bypass channel.

U.S. Pat. No. 9,492,045 (Conrad) discloses a surface cleaning apparatus which uses multiple filters. The upstream filter comprises a hollow cylindrical filter and the downstream filter comprises a planar filter. The filters may be provided at different locations in the surface cleaning apparatus and may be separately removable. Accordingly, multiple steps may be required to remove the filters for cleaning or replacement.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

According to one broad aspect a filter assembly for a surface cleaning apparatus is provided that has at least two spaced apart filter elements. The filter elements are arranged in a sequence, with a first upstream filter connected in series with a second downstream filter. In some cases, three or more filter elements may be used, with a first filter, a second filter and a third filter in sequence. The filter assembly is configured to define a gap between at least two of the filter elements, and optionally, between each of the filter elements. The filter apparatus is configured to inhibit and, optionally, to prevent air from bypassing one of the filter elements and, optionally, all of the filter elements so that substantially all, and optionally all, of the air in an air stream flows through all of the filter elements. Accordingly, the air is filtered through the first filter and also filtered by the second filter (and any subsequent filters).

An advantage of this design is that, as the filter assembly is used, portions of the upstream filter may start to be clogged with dirt. As a result, the air flow rate through the remaining portions of the filter will increase. This can result in more dirt being pulled through the upstream filter. If the downstream filter is placed in an abutting relationship with the upstream filter, the air will tend to travel generally linearly through the downstream filter and, accordingly, portions of the downstream filter that are aligned with the clogged portions of the upstream filter will tend to have less air flow therethrough. This may result in a higher flow rate of air through portions of the downstream filter and accordingly, more dirt being drawn through the downstream filter. Providing a gap between the downstream face of the first filter element or layer and the upstream face of the second filter element or layer permits the air to spread out across the upstream face of the second filter layer and to pass more evenly through the downstream filter layer. Accordingly, all of the downstream filter may be used more evenly resulting in a reduced flow rate through the downstream filter, and providing for more effective filtering by the second filter. Because air is encouraged to flow through all, or substantially all, of the upstream face of the filter layers used, the filter assembly may filter more air before having to be cleaned or replaced.

A further advantage of this design is that the filter layers may be individually mounted to a filter holder. Concurrently applying to filter layers to a filter holder may result in one or both of the filter layers tearing.

In accordance with this broad aspect, there is provided a surface cleaning apparatus having an air flow path from a dirty air inlet to a clean air outlet and including an air treatment member, a suction motor and a filter assembly provided in the air flow path, the filter assembly comprising:

a) a first physical filter media having an upstream face and a downstream face; and, b) a second physical filter media having an upstream face and a downstream face, wherein the upstream face of the second physical filter media is spaced from and faces the downstream face of the first physical filter media, wherein the filter assembly is configured to inhibit air bypassing the first physical filter media.

In some embodiments, the filter assembly may be a pre-motor filter.

In some embodiments, the filter assembly may be removable from the surface cleaning apparatus as a unit.

In some embodiments, the first physical filter media may be mounted in a filter housing and the filter housing may have an absence of a by-pass passage.

In some embodiments, the filter assembly may further comprise an upstream first filter header and the filter housing and the first filter header may direct all air flowing through the air flow path at a location immediately upstream of the first filter header through the first physical filter media.

In some embodiments, the first physical filter media may provide the only air passage from a location immediately upstream of the first physical filter media to a location downstream of the first physical filter media.

In some embodiments, each of the first and second physical filter media may have an average pore size and the average pore size of the second physical filter media may be smaller than the average pore size of the first physical filter media.

In some embodiments, the first physical filter media may comprise foam and the second physical filter media may be selected from the group consisting of felt, electret, Filtrete™ and foam.

In some embodiments, each of the first and second physical filter media may have a diameter and the diameter of the first physical filter media may be between about 75% and 125% of the diameter of the second physical filter media. Optionally, the diameter of the first physical filter media may be generally the same as the diameter of the second physical filter media.

In some embodiments, each of the first and second physical filter media may have a cross-sectional area in a direction transverse to air flow therethrough and the cross-sectional area of the first physical filter media may be between about 75% and 125% of the cross-sectional area of the second physical filter media. Optionally, the cross-sectional area of the first physical filter media may be generally the same as the cross-sectional area of the second physical filter media.

In some embodiments, the filter assembly may further comprise a third physical filter media having an upstream face and a downstream face, wherein the upstream face of the third physical filter media may be spaced from and faces the downstream face of the second physical filter media. Optionally, the third physical filter media has an average pore size and the average pore size of the third physical filter media may be smaller than the average pore size of the second physical filter media. Alternately, or in addition, each of the first and second physical filter media may comprise foam and the third physical filter media may be selected from the group consisting of felt, electret, Filtrete™ and foam. Alternately, or in addition, the first physical filter media comprises foam and the second physical filter media is selected from the group consisting of felt, electret, Filtrete™ and foam.

In some embodiments, each of the first, second and third physical filter media has a diameter and the diameter of the first physical filter media may be between about 75% and 125% of the diameter of the second physical filter media, and the diameter of the third physical filter media may be between about 75% and 125% of the diameter of the second physical filter media. Optionally, the diameters of the first, second and third physical filter medias may be generally the same.

In some embodiments, each of the first, second and third physical filter media has a cross-sectional area in a direction transverse to air flow therethrough and the cross-sectional area of the first physical filter media may be between about 75% and 125% of the cross-sectional area of the second physical filter media, and the cross-sectional area of the third physical filter media may be between about 75% and 125% of the cross-sectional area of the second physical filter media. Optionally, the cross-sectional areas of the first, second and third physical filter media may be generally the same.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 15 is a perspective illustration of a cross-section of an exemplary surface cleaning apparatus comprising a fifth example embodiment of a filter apparatus; and, FIG. 16 is a cross-section of the filter apparatus of FIG. 15.

Figure 1:
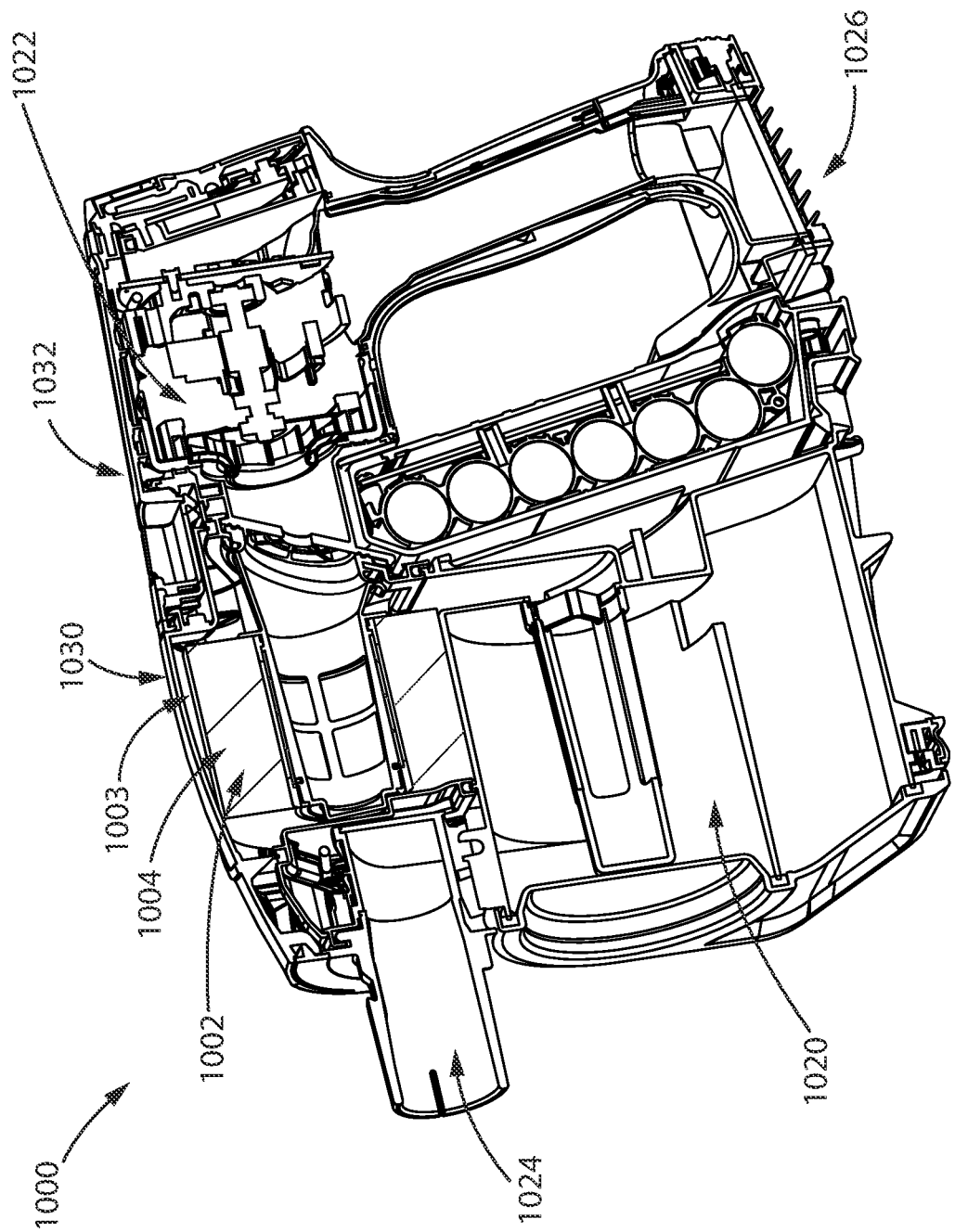
FIG. 1 is a perspective illustration of a cross-section of an exemplary surface cleaning apparatus comprising a first example embodiment of a filter apparatus.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

Figure 2:
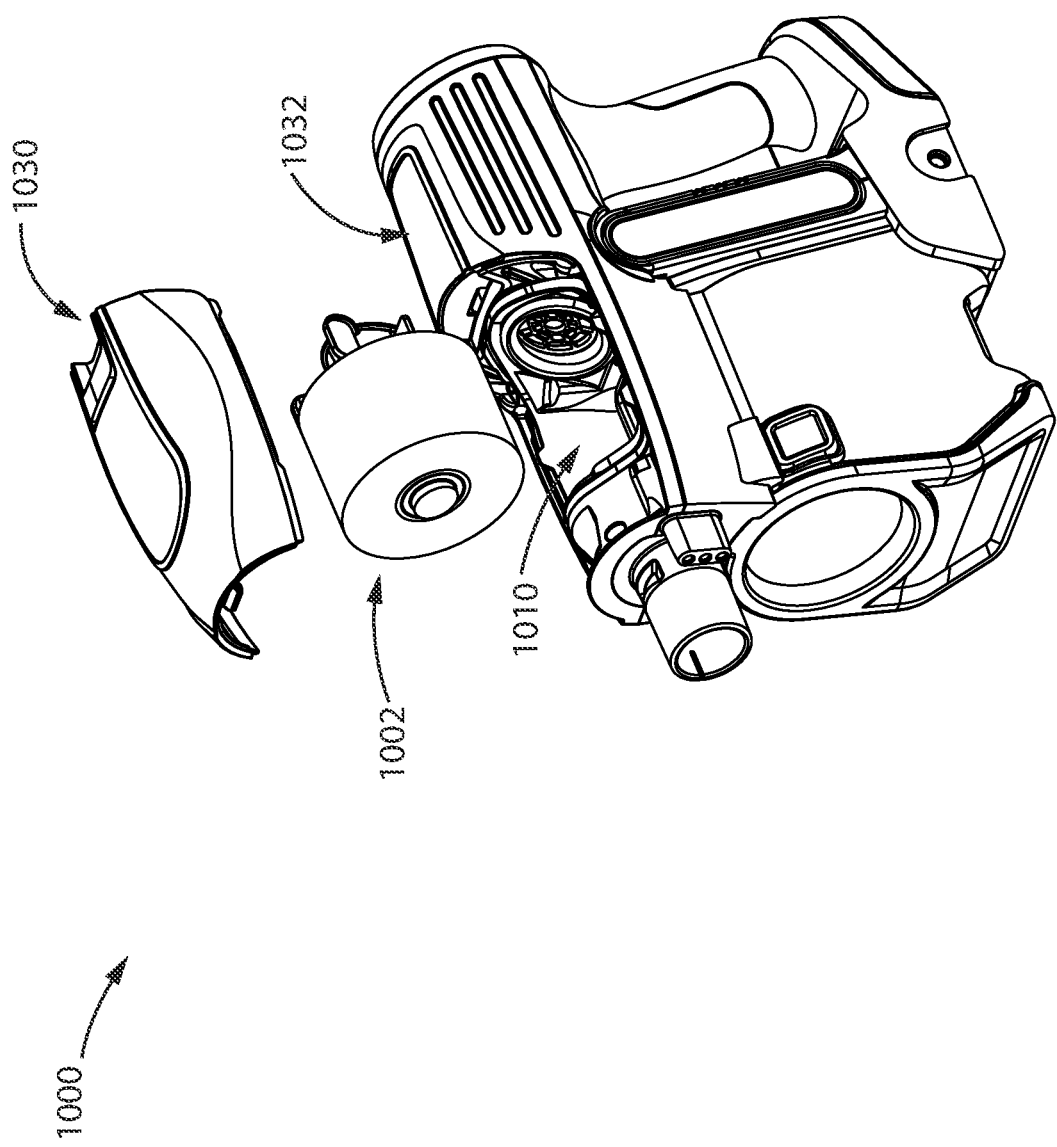
FIG. 2 is a perspective illustration of the surface cleaning apparatus of FIG. 1 with the filter apparatus removed.
Figure 3:
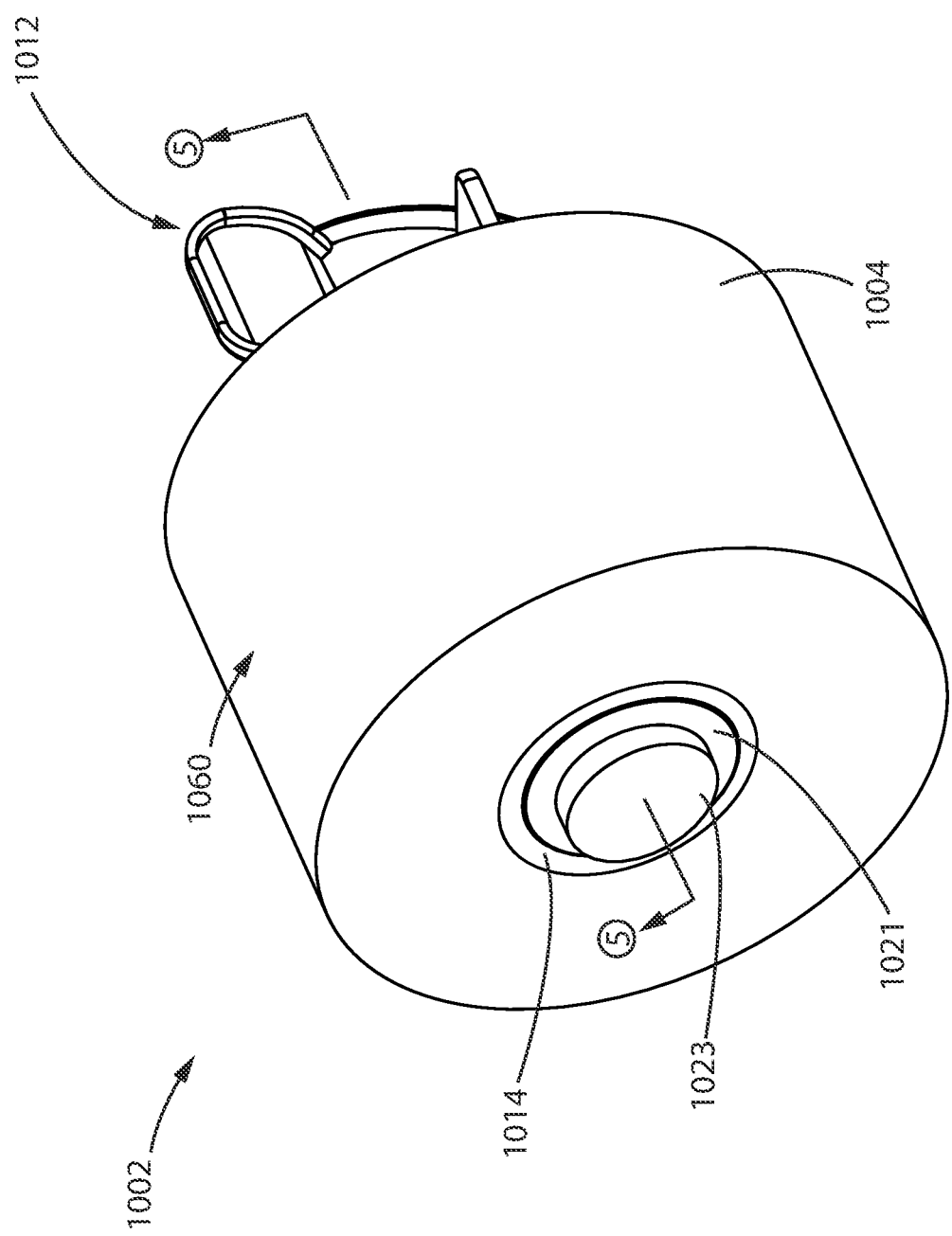
FIG. 3 is a front perspective illustration of the first example embodiment of a filter apparatus.
Figure 4:
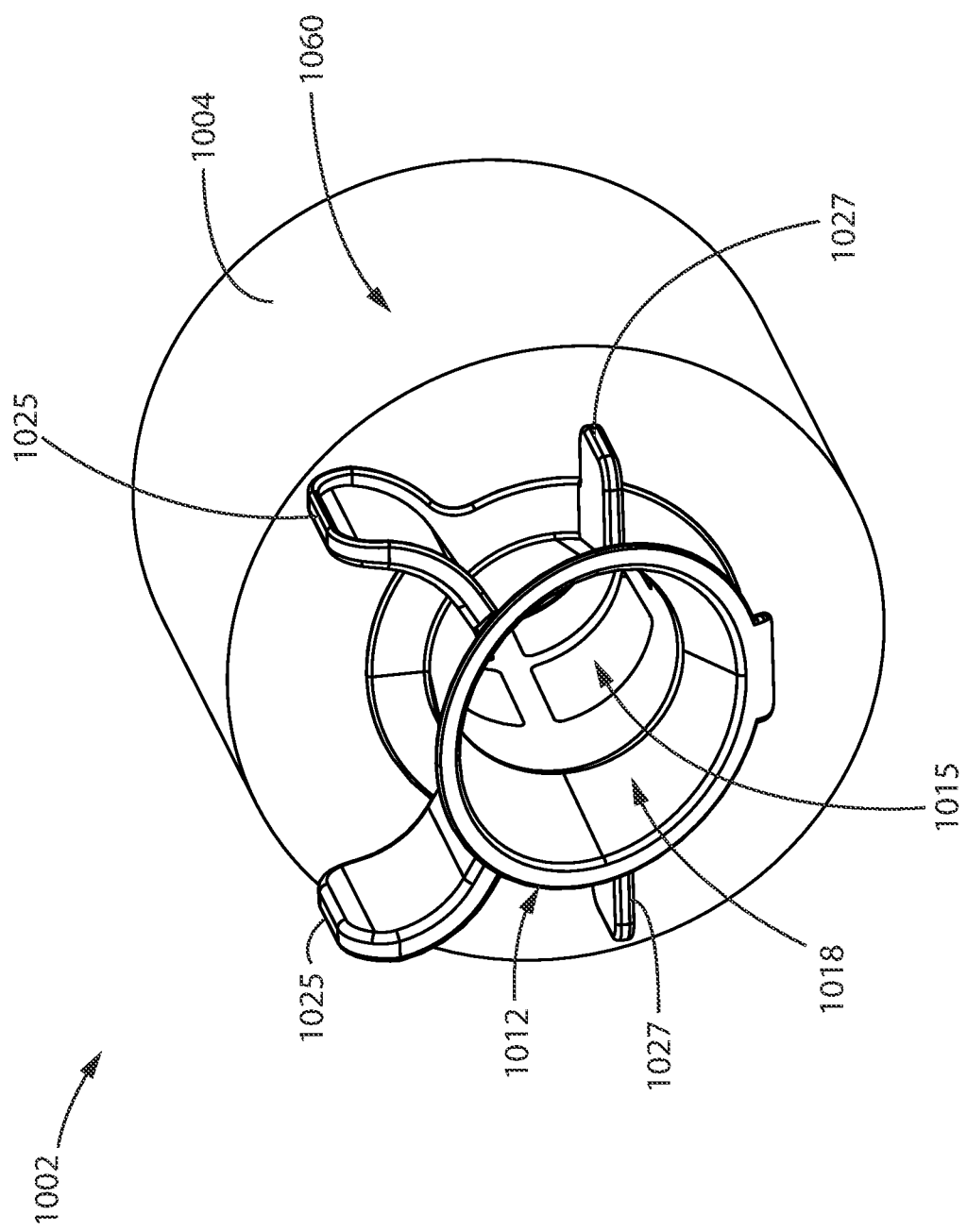
FIG. 4 is a rear perspective illustration of the filter apparatus of FIG. 3.

Referring to FIGS. 1 and 2, an exemplary surface cleaning apparatus 1000 comprising an embodiment of a filter apparatus 1002 is shown. In the embodiment shown, the surface cleaning apparatus 1000 is a portable hand vacuum cleaner, and more particularly, is a cyclonic portable hand vacuum cleaner. In alternate embodiments, the filter apparatus 1002 may be provided in another type of surface cleaning apparatus, such as an upright vacuum cleaner, a canister-type vacuum cleaner, an extractor or a filter-bag type vacuum cleaner. Such vacuum cleaners may of any design.

The surface cleaning apparatus 1000 comprises a main body with an outer wall 1032. An airflow passage extends within the outer wall 1032, from a dirty air inlet 1024 to a clean air outlet 1026. A cyclone unit 1020 is optionally positioned in the airflow passage, downstream of the dirty air inlet 1024. The cyclone unit 1020 may comprise a cyclone, which removes dirt from air in the airflow passage. In alternate embodiments, other air treatment members may be positioned in the airflow passage to remove dirt from the air in the air flow passage. A suction motor 1022 is also provided in the airflow passage. The suction motor 1022 draws air through the airflow passage. In the exemplified embodiment, the suction motor 1022 is provided in the airflow passage, downstream of the cyclone unit 1020. It will be appreciated that the operational components of a surface cleaning apparatus may be of any type and they may be in any arrangement.

As shown in FIG. 1, in the exemplified embodiment, a pre-motor filter apparatus 1002 is provided in the airflow passage, between the cyclone unit 1020 and the suction motor 1022. In alternate embodiments, the filter apparatus 1002 may be positioned elsewhere in the airflow passage, such as downstream of motor 1022, or in cyclone unit 1020.

The filter apparatus 1002 is a filter assembly with two or more spaced apart layers of physical filter media. As used herein, "filter", "filter layer" and "filter element" are used to refer to a layer of physical filter media unless the context indicates otherwise.

Referring now to FIGS. 2-6, the filter apparatus 1002 may comprise a first or upstream filter 1004, and a second or downstream filter 1006. The first filter 1004 has an upstream surface 1060 and a downstream surface 1062. Similarly, the second filter 1006 has an upstream surface 1064 and a downstream surface 1066. As exemplified in FIG. 5, the upstream surface 1064 of the second filter 1006 is positioned spaced from and facing the downstream surface 1062 of the first filter 1004. Thus, air flowing through the first filter 1004 and out downstream surface 1062 may then flow through the upstream surface 1064 of the second filter 1006 as shown by arrows in FIG. 5.

The first filter 1004 and the second filter 1006 may be any suitable type of physical filter media, such as a foam filter, a felt filter, an electret filter, a Filtrete™ filter, or any other type of filter. Preferably, the second filter 1006 has pores that are smaller than the pores of the first filter 1004. For example, the first filter 1004 may comprise a foam filter medium and the second filter 1006 may use a physical filter medium selected from the group consisting of felt, electret, Filtrete™ and foam. The first filter 1004 may allow smaller particles of dirt to pass therethrough to reduce the air pressure on the upstream face 1060.

As the second filter 1006 may capture smaller particles of dirt than first filter 1004 alone, the air that is emitted at the clean air outlet 1026 may be more thoroughly filtered. Providing an increasingly granular filtering of the air in the air flow passage may allow the air to be more thoroughly filtered without rapidly clogging the upstream face of the first filter. This may also reduce pressure at the upstream face of each filter 1004 and 1006.

Alternatively, the upstream filter 1004 and the downstream filter 1006 each have the same size pores. Accordingly, the first filter 1004 and second filter 1006 may each use the same type of physical filter medium.

Figure 5:
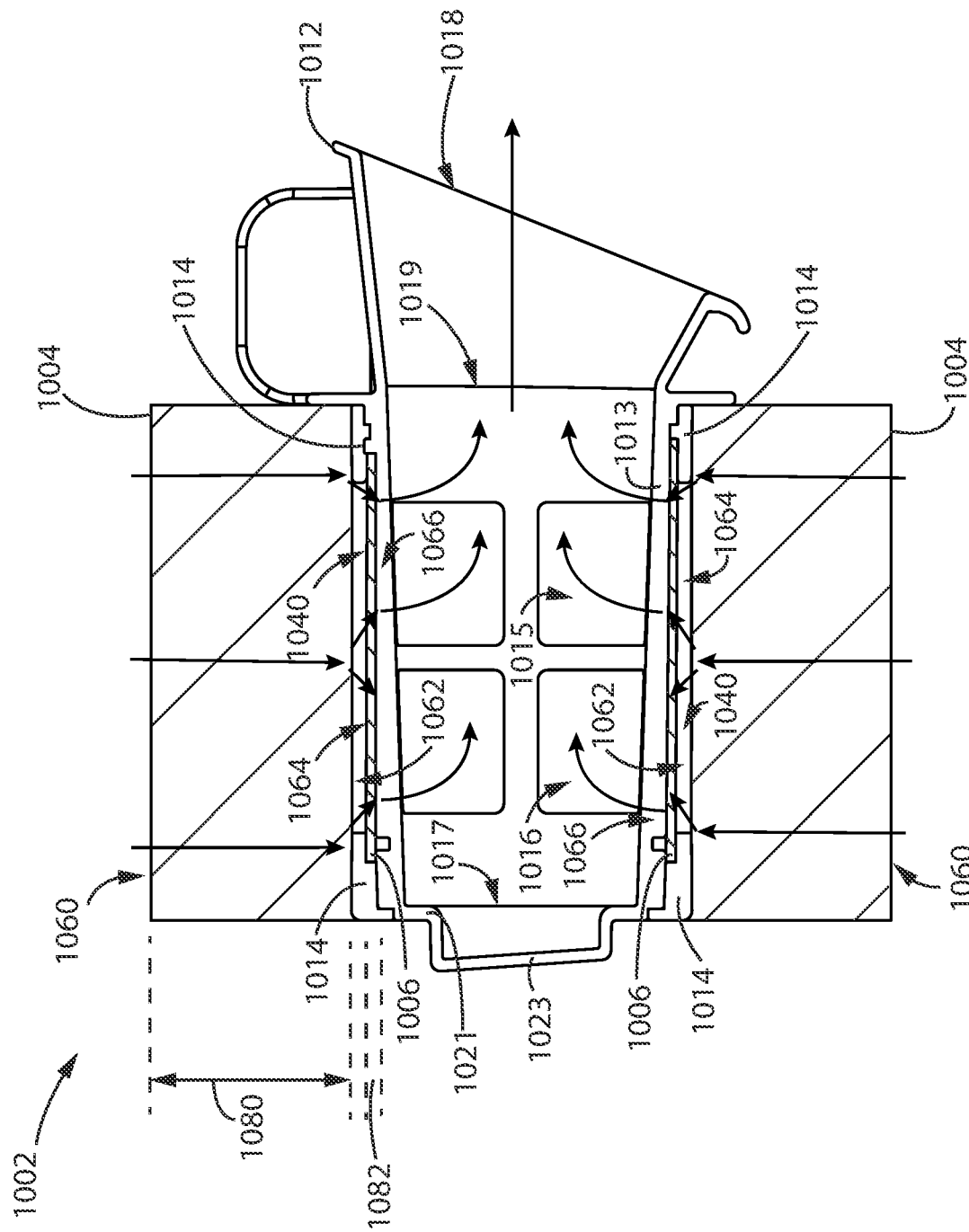
FIG. 5 is a cross-section taken along line 5-5 in FIG. 3.

As exemplified in FIG. 5, the upstream surface 1064 of the second filter 1006 is spaced apart from the downstream surface 1062 of the first filter 1004. Accordingly, the filter assembly 1002 may be configured to define a gap 1040 between the upstream face 1064 of the second filter 1006 and the downstream face 1062 of the first filter 1004. The gap 1040 may reduce the flow rate of air after it has passed through the first filter 1004 and before it is incident on the upstream face 1064 of the second filter 1006. This may reduce pressure on the upstream face 1064 of the second filter 1006 and increase the effectiveness of the second filter 1006.

As the first filter 1004 is used, the upstream surface 1060 may collect dirt. Regions of the upstream face 1060 may accumulate more dirt than other locations. Air passing through a filter will tend to travel generally linearly. Accordingly, portions of the filter media behind (downstream) the portions which have higher concentrations of dirt will tend to be less used. Conversely, more air will tend to enter the filter media at the cleaner regions of the upstream surface of the first filter 1004 and to flow generally linearly through the filter media behind the cleaner regions. Further, the air flow rate through the cleaner regions will increase compared to the air flow rate through the filter media when the filter media is new. Providing a gap 1040 allows air that has passed through the first filter 1004 to spread out across the upstream face 1064 of the second filter 1006. Thus, gap 1040 may operate as a header and encourage air exiting the first filter 1004 to engage a larger surface area of the upstream face 1064 of the second filter 1006 rather than just those portions of the upstream face 1064 that are aligned with the cleaner regions of the first filter 1004.

In the example shown in FIGS. 2-6, the first filter 1004 and second filter 1006 are annular or substantially annular. This may enable a larger surface area of the upstream surface of each filter. In alternate embodiments, other suitable shapes of filter may be used such as the planar filters shown in FIGS. 13-16.

In this embodiment, filter apparatus 1002 comprises a filter housing 1010. As exemplified, the filter housing 1010 comprises a portion of the outer wall 1032 of the surface cleaning apparatus 1000 and may be integrally formed therewith. In the embodiment shown, filter housing 1010 also comprises a portion of the sidewall of cyclone unit 1020 and may be integrally formed therewith. Additionally or alternatively, the filter housing 1010 may comprise a portion of the suction motor housing and may be integrally formed therewith (see FIGS. 13-16).

The filter assembly 1002 may be configured to prevent or inhibit air from bypassing the first filter 1004. Preferably, the filter assembly 1002 may also inhibit air from bypassing the second filter 1006. Thus, all or substantially all the air in the air flow passage may be forced to flow through both the first filter 1002 and the second filter 1004. This may provide for a more thorough filtering of the air in the airflow passage.

The filter housing 1010 may be configured to inhibit air from bypassing the first filter 1004. That is, the filter housing 1010 may not provide any by-pass passages that allow air to circumvent either filter 1004 or 1006. Thus, all, or substantially all, the air in the air flow passage may be forced to flow through both the first filter 1004 and the second filter 1006.

In some embodiments, the filter assembly 1002 may also include a first filter header 1003 upstream from the upstream surface 1060 of the first filter 1004. The first filter header 1003 may allow air to spread around, and pass through, the entire upstream face 1060 of the first filter 1004. As a result, the first filter 1004 may provide a larger effective surface area for filtering. This may prolong the useful life of filter assembly 1002 before it needs to be cleaned or replaced, as air is permitted flow through cleaner regions of the first filter 1004 when dirt accumulates on other locations of the upstream face 1060.

The filter assembly 1002 may be configured to direct all air flowing through the air flow path at a location immediately upstream of the first filter header 1003 through the first filter 1004. The filter housing 1010 may be arranged along with the first filter header 1003 such that the only path for air immediately upstream of the first filter header 1003 is through the first filter 1004. That is, the first filter 1004 may provide the only air passage from a location immediately upstream of the first filter 1004 to a location downstream of the first filter 1004.

Figure 6:
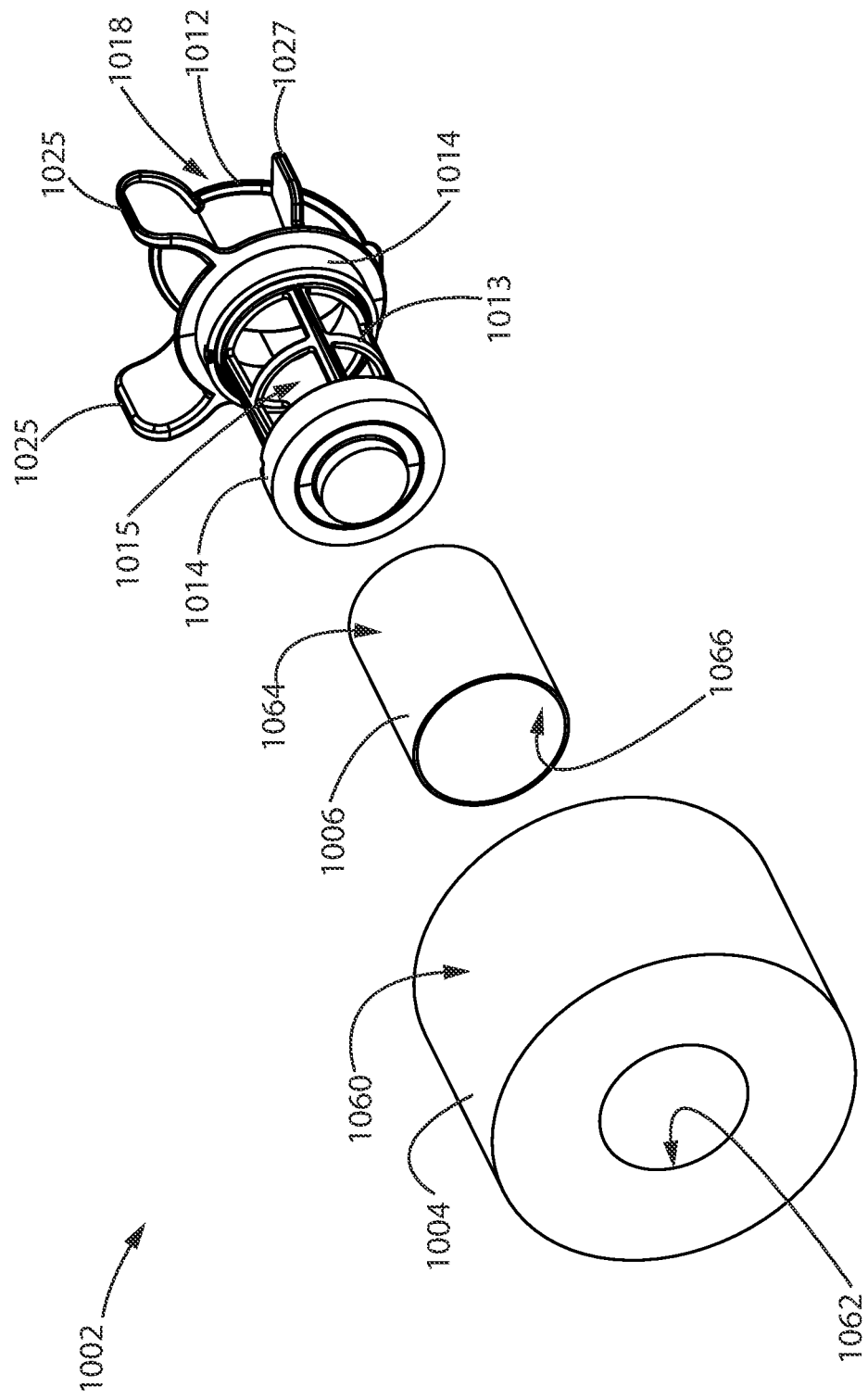
FIG. 6 is an exploded view of the filter apparatus of FIG. 3.

Preferably, the filter apparatus 1002 includes a filter support member 1012. As shown in FIG. 6, generally annular filters 1004 and 1006 are supported by filter support member 1012. Filter support member 1012 has an outlet conduit 1018 for directing an air flow after it has passed through the filters 1004 and 1006. As shown in FIG. 5, in use, air flows from an outer or upstream surface 1060 of the first filter 1004, through the first filter media, to an inner or downstream side 1062 of the first filter 1004. The air then flows through gap 1040 to the upstream surface 1064 of the second filter 1006, through the second filter media, and to the outlet conduit 1018 via apertures 1016 in the support member 1012.

As illustrated in FIG. 6, filter support member 1012 has a main body portion 1013 that extends into a hollow interior of the generally cylindrical filter 1006. In the illustrated embodiment, an outer surface of main body portion 1013 is flush with a downstream or inner surface 1066 of filter 1006, and the downstream surface 1064 is in air flow communication with an internal filter conduit 1015. More specifically, in the illustrated example a plurality of apertures 1016 define a porous portion of the filter support member 1012 between a first end 1017 and a second end 1019 of the main body portion 1013. It will be appreciated that more or fewer apertures may be provided in alternative embodiments.

The outlet conduit 1018 extends from the second end 1019 of the main body portion 1013. The first or opposed end 1017 of the main body portion 1013 is sealed to inhibit and preferably prevent air from exiting the internal filter conduit 1015 from the second end, so that substantially and preferably all of the air that exits the downstream side 1064 of the downstream filter 1006 is directed through outlet conduit 1018. In the illustrated example, an end wall 1021 is provided to cap the opposed end 1017 of the main body portion 1013. Optionally, end wall 1021 has an outwardly projecting portion 1023 to facilitate positioning the filter assembly 1002 in a surface cleaning apparatus.

As shown in FIG. 2, the filter apparatus 1002 may be removable from the surface cleaning apparatus 1000 as a unit. Optionally, the filter housing 1010 may be openable, and at least a portion of the outer wall 1032 (e.g. removable or otherwise openable door 1030) may be removable, openable, or otherwise re-configurable to provide access to the interior of the filter housing 1010.

Additionally or alternatively, a portion of the filter housing 1010 may be removable from the surface cleaning apparatus along with the filter assembly 1002. This may facilitate removing the filter assembly 1002 without having to contact with filters 1004 and 1006, which may become dirty during use.

Optionally, one or more alignment projections may be provided on the outer surface of outlet conduit 1018. In the illustrated example, a pair of alignment flanges 1025 extend from an axially longer side of outlet conduit 1018. Flanges 1025 may facilitate in the seating and/or alignment of filter assembly 1002 within the surface cleaning apparatus 1000. For example, in the illustrated example the flanges 1025 may be configured to act as camming surfaces with one or more projections from an internal surface of the openable door 1030 of the filter housing 1010.

Additionally, or alternatively, flanges 1025 may allow a user to grip and/or manipulate filter assembly 1002 without having to come into contact with filters 1004 and 1006, which may become dirty during use.

Optionally, one or more support projections may be provided on one or both ends of the filter assembly 1002. In the illustrated example, a pair of support flanges 1027 extend from opposite lateral sides of outlet conduit 1018. Flanges 1027 may facilitate the support and/or alignment of filter assembly 1002 within a filter housing 1010.

In the illustrated embodiment, filter support member 1012 (including outlet conduit 1018, main body portion 1013, and end wall 1021) is a one piece assembly (e.g. integrally formed). In alternative embodiments, filter support member 1012 may be constructed from two or more parts.

The filter support member 1012 may be configured to define the gap 1040 between the filters 1004 and 1006. As shown in FIG. 6, the filter support member 1012 may also include shoulders 1014. In the example embodiment shown in FIGS. 2-6, the gap 1040 between the first filter 1004 and the second filter 1006 is defined by the shoulders 1014 of the filter support member 1012.

Additionally or alternatively, the first filter 1004 or second filter 1006 may have one or more projections or recessed portions that define the gap 1040.

Additionally or alternatively, separate spacing members may also be provided between the first filter 1004 and second filter 1006 to define the gap 1040 therebetween.

As exemplified in FIG. 5, the upstream filter 1004 seats on the shoulders 1014 while the downstream filter 1006 seats on the porous portion. Accordingly, the height of the shoulders, less the thickness of the filter 1006, may define the thickness of height of the gap 1040. During use, the downstream face of filter 1004 may tend to deflect towards the upstream face of filter 1006. It will be appreciated that, as discussed previously, one or more additional spacing members extending between filters 1004, 1006, such as spacer members 1246 exemplified in FIG. 12) may be provided along the length of gap 1040.

In the example shown in FIGS. 2-6, the thickness 1080 of the first filter 1004 is substantially larger than the thickness 1082 of the second filter 1006. Alternatively, the thickness 1080 of the first filter 1004 may be generally the same as the thickness 1082 of the second filter 1006.

Optionally, the surface area in a direction orthogonal to the direction of air flow entering of the first filter 1004 may be between about 75% and 125% of the surface area in a direction orthogonal to the direction of air flow entering the second filter 1006. In the filter apparatus 1002, the surface area of the upstream surface 1060 of the first filter 1004 is larger than the surface area of the upstream surface 1064 of the second filter 1006.

In the examples of FIGS. 13-16, the filters are planar and are disc shaped. In such a case, the diameter of the first physical filter media 1004 may be between about 75% and 125% of the diameter of the second physical filter media 1006. If the filters are not disc shaped, then the cross-sectional area of the first physical filter media 1004 in a direction transverse to air flow therethrough may be between about 75% and 125% of the cross-sectional area of the second physical filter media 1006 in a direction transverse to air flow therethrough.

Alternatively, the cross-sectional area of the first filter 1004 in a direction transverse to air flow therethrough may be generally the same as the cross-sectional of the second filter 1006 in a direction transverse to air flow therethrough.

Figure 7:
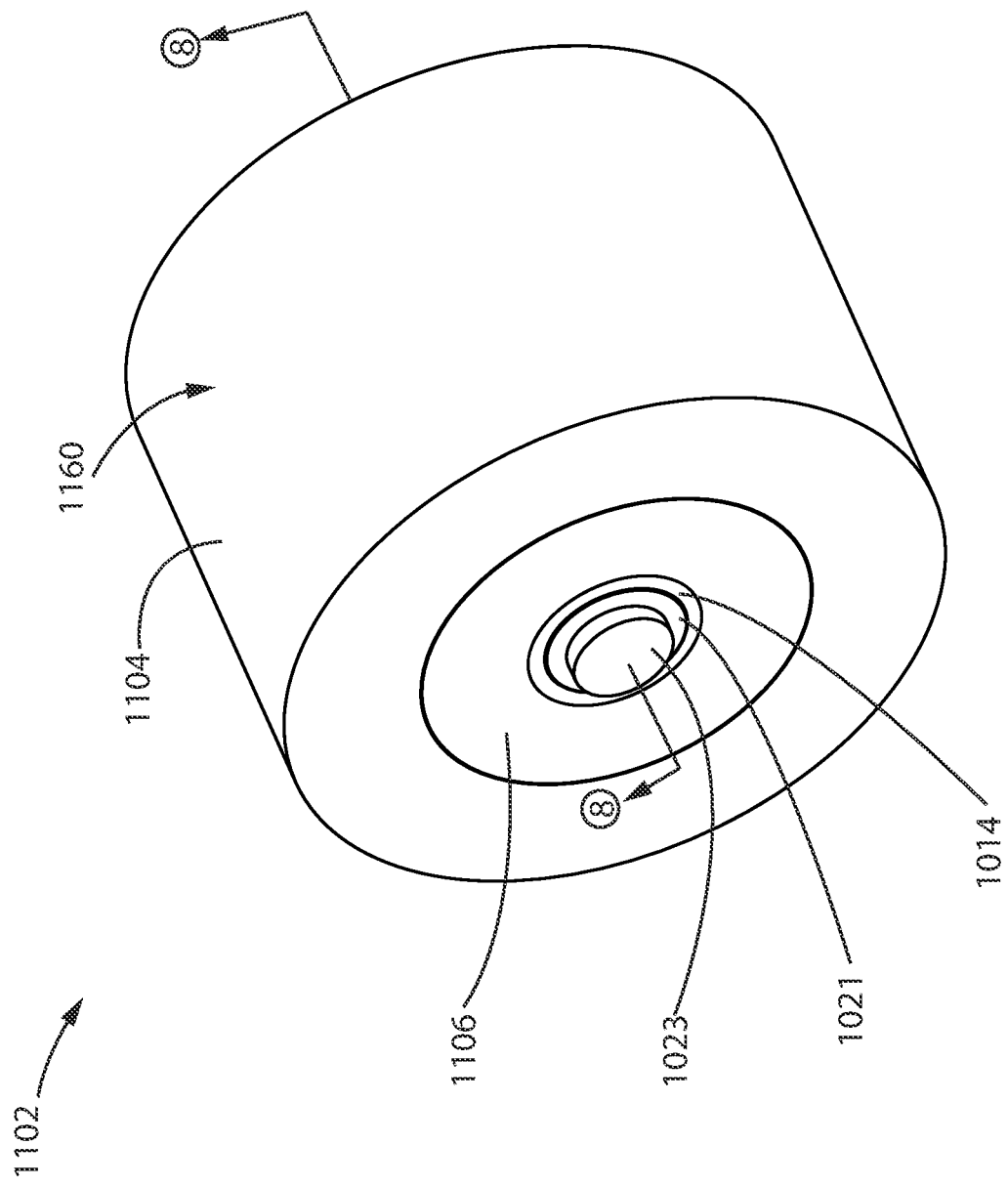
FIG. 7 is a front perspective view of a second example embodiment of a filter apparatus.
Figure 8:
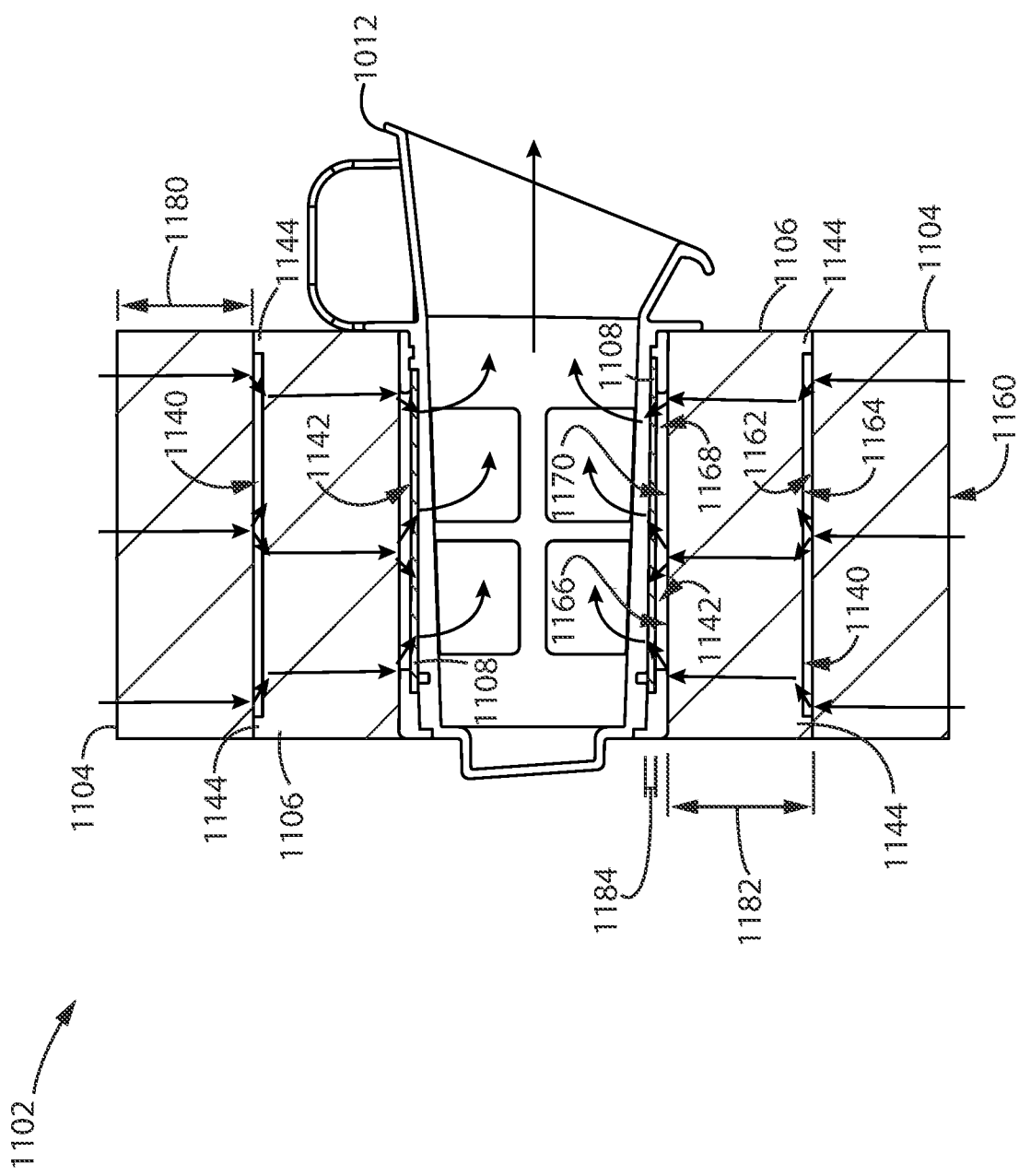
FIG. 8 is a cross-section taken along line 8-8 in FIG. 7.
Figure 9:
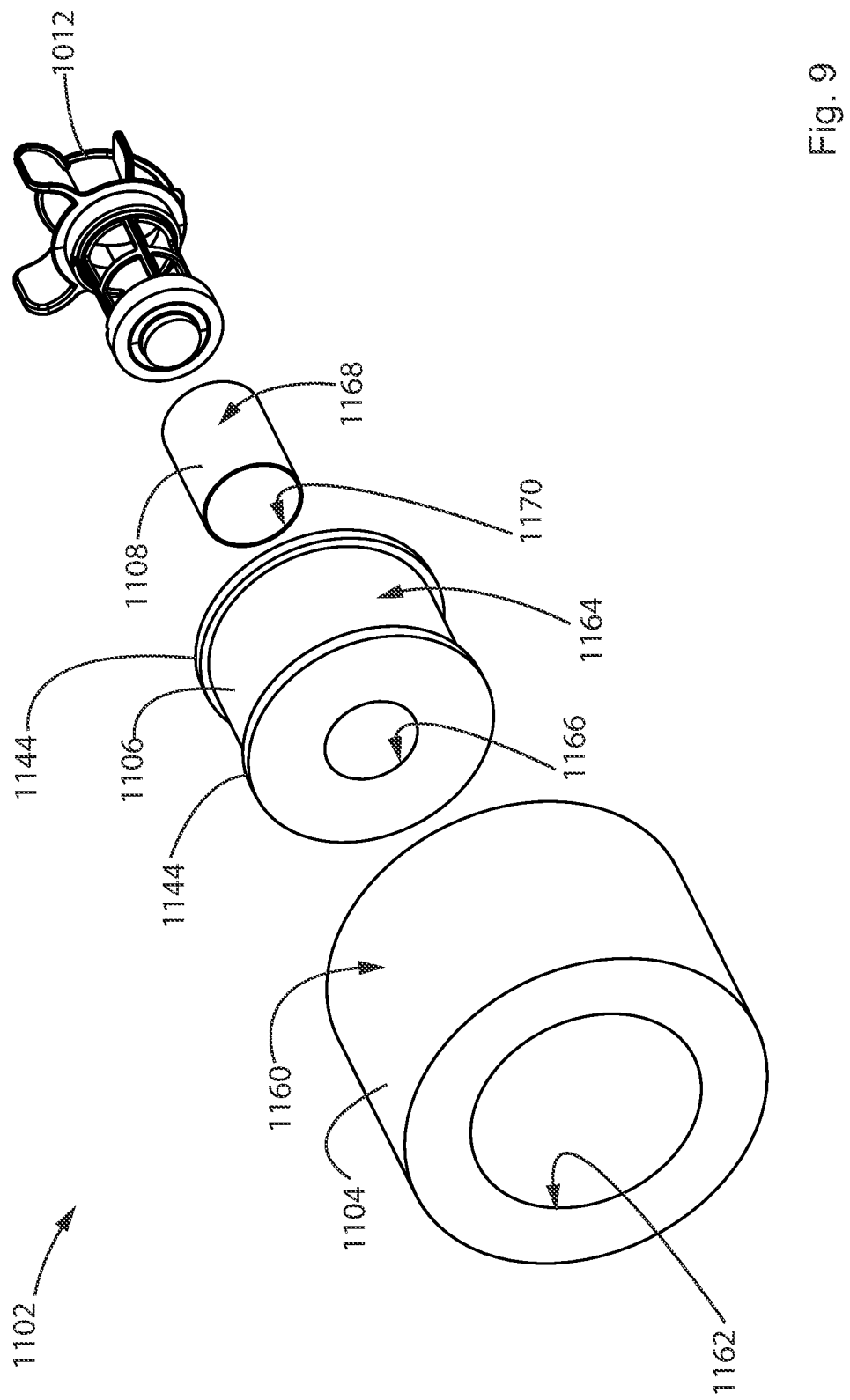
FIG. 9 is an exploded view of the filter apparatus of FIG. 7.

Referring now to FIGS. 7-9, a second example embodiment of a filter apparatus 1102 is shown. The structure of filter apparatus 1102 is generally the same as filter apparatus 1002, except that filter apparatus 1102 has three layers of physical filter media rather than the two layers of filter apparatus 1002.

The filter apparatus 1102 includes a first upstream filter 1104, a second intermediate filter 1106 and a third downstream filter 1108. In general, the third downstream filter 1108 corresponds to the downstream filter 1006.

The upstream filter 1104 also generally corresponds to upstream filter 1004, although the hollow inner portion of upstream filter 1104 may be larger to accommodate the intermediate filter 1106. As shown, the thickness of upstream filter 1104 may be the same as upstream filter 1004, but the overall diameter may be larger in order to accommodate the second filter 1106. Alternatively, the thickness of the upstream filter 1104 may be reduced to accommodate the second filter 1106 while providing a filter assembly 1102 requiring less space in the surface cleaning apparatus 1000.

As with filter apparatus 1002, in filter apparatus 1102 the upstream face 1164 of the second filter 1106 is spaced apart from and facing the downstream face 1162 of the first filter 1104. However, the gap 1140 between the first filter 1104 and the second filter 1106 is defined by legs 1144 provided on the second filter 1106. The legs 1144 extend from the second filter 1106 to the first filter 1104 at each end of the second filter 1106 with a space between the legs 1144 defining the gap 1140. In filter apparatus 1102, the gap 1140 may be considered a recess in the upstream surface 1164 of the second filter 1106. The legs 1144 may be made of the filter media, alone or reinforced with a rigid substrate. Additional legs may be provided intermediate the two longitudinally spaced apart legs 1144 that are illustrated. Alternately, or in addition, a separate rigid member, such as spacer members 1246 exemplified in FIG. 12 may be used.

In filter apparatus 1102, the downstream face 1166 of the second filter 1106 faces the upstream face 1168 of the third filter 1108. The upstream face of the third filter 1108 is spaced apart from the downstream face 1166 of the second filter 1106 with a gap 1142 defined therebetween.

The gap 1142 functions in a manner similar to the gaps 1140, 1040 and may reduce the air flow rate of air exiting the downstream face 1166 of the second filter 1106. The gap 1142 may also permit the air to spread across substantially all of the upstream face 1168 of the third filter 1108.

As exemplified, the third filter 1108 is mounted on a filter support member 1012 in a manner analogous to the second filter 1006. Air from the downstream face 1166 of the second filter 1106 flows through the third filter 1108, out the downstream face 1170 of the third filter 1108 and into the internal filter conduit 1015.

The first filter 1104, second filter 1106, and third filter 1108 may be any suitable type of physical filter media, such as a foam filter, a felt filter, an electret filter, a Filtrete™ filter, or any other type of filter. Preferably, each of the first and second physical filter media comprises foam and the third physical filter media is selected from the group consisting of felt, electret, Filtrete™ and foam.

Preferably, the third filter 1108 has pores that are smaller than the pores of the second filter 1106. Preferably, the second filter 1106 has pores that are smaller than the pores of the first filter 1104. This may provide a gradual, three-stage filtering of the air that flows through the filter assembly 1102 which may ensure that the upstream faces of filters 1104, 1106 and 1108 may accumulate dirt at similar rates. This may also provide a more consistent air flow rate though each of the filters 1104, 1106 and 1108.

Alternatively, the pores of the first filter 1104 and second filter 1106 may be the same, while the third filter 1108 has pores that are smaller than the pores of the second filter 1106.

Alternatively, the pores of the first filter 1104, second filter 1106 and third filter 1108 may each be the same size.

Any suitable thickness of filter may be used for the first filter 1104, second filter 1106 and the third filter 1108. Preferably, the thickness 1180 of the first filter 1104 may be between about 75% and 125% the thickness 1182 of the second physical 1106. More preferably, as shown in FIG. 8, the thickness 1180 of the first filter 1104 may be generally the same as the thickness 1182 of the second physical 1106. In the example shown in FIG. 8, the thickness 1184 of the third filter 1108 is substantially less than the thickness 1180 of the first filter 1104 or the thickness 1182 of the second filter 1106.

Figure 10:
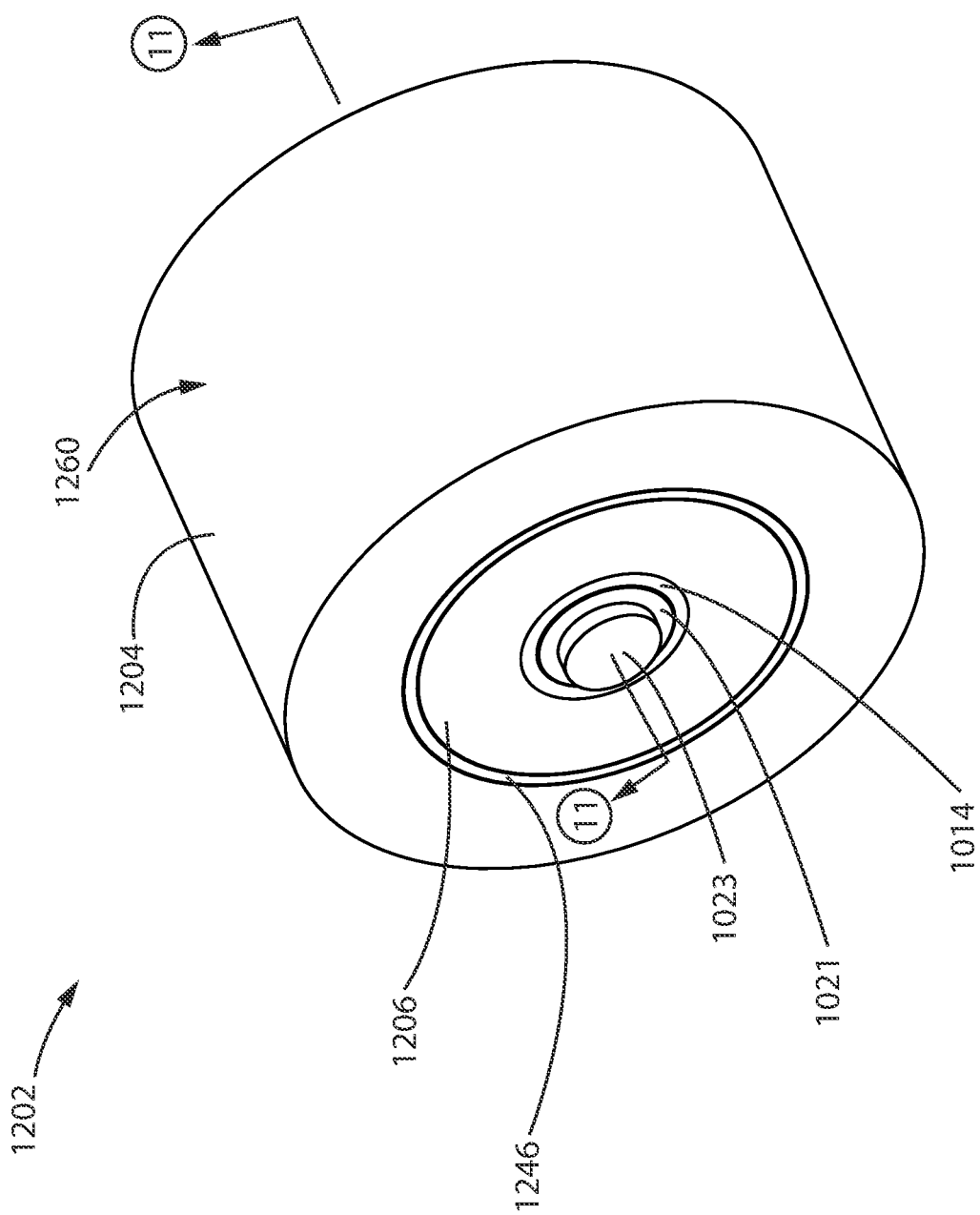
FIG. 10 is a front perspective view of a third example embodiment of a filter apparatus.
Figure 11:
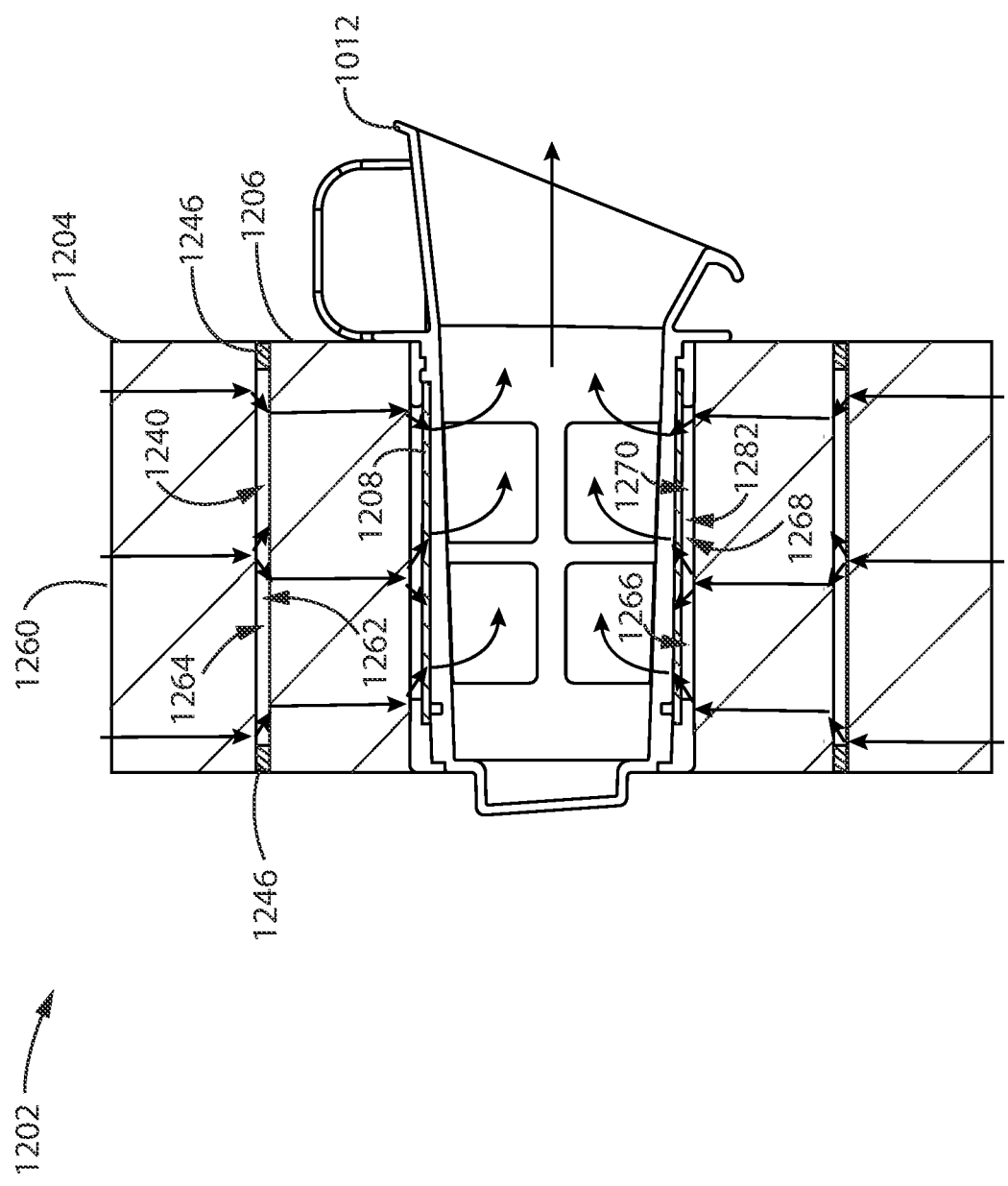
FIG. 11 is a cross-section taken along line 11-11 in FIG. 10.
Figure 12:
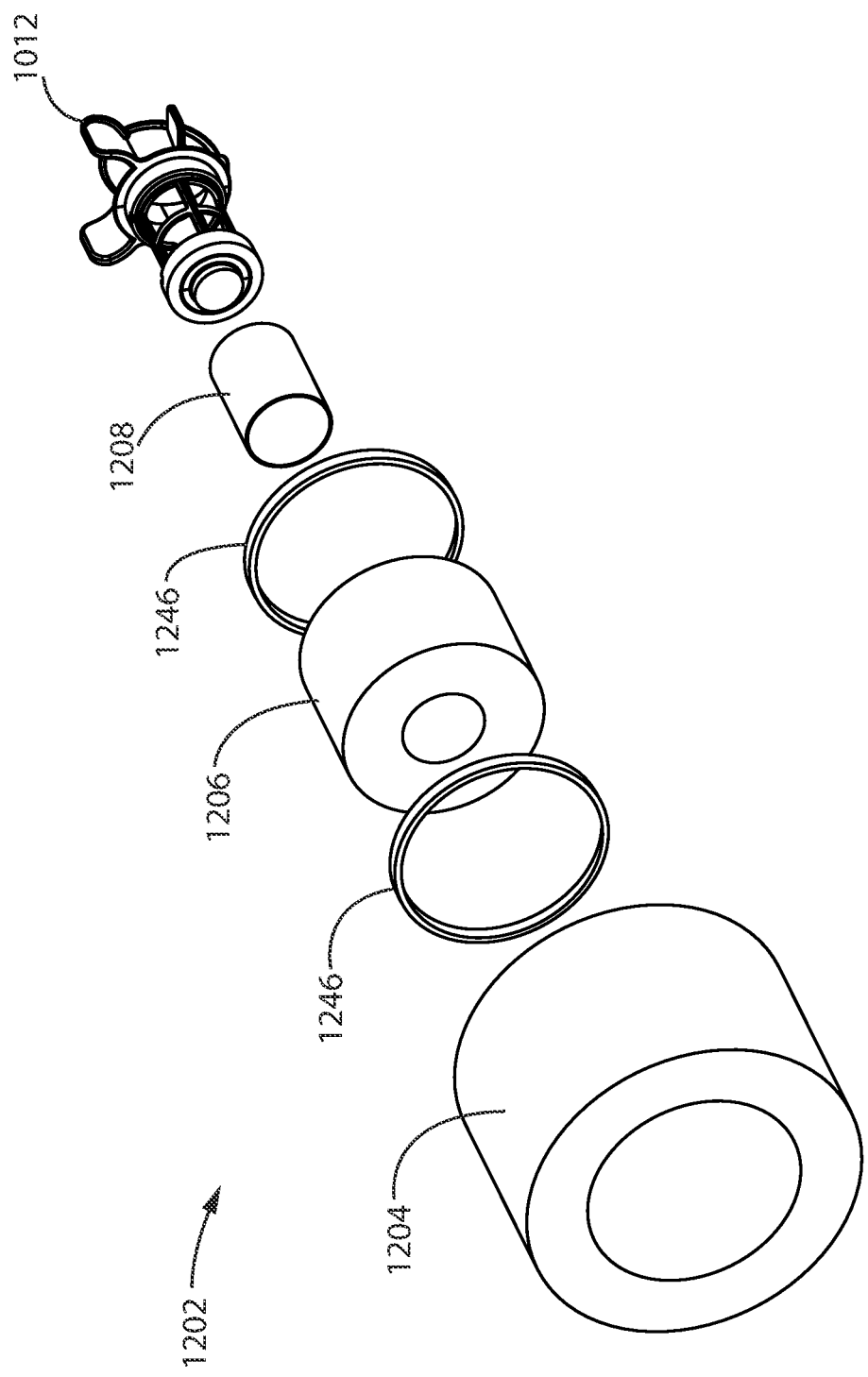
FIG. 12 is an exploded view of the filter apparatus of FIG. 10.

Referring now to FIGS. 10-12, shown therein is a third embodiment of a filter apparatus 1202. Similar to filter apparatus 1102 described above, the filter apparatus 1202 also includes three filter layers 1204, 1206 and 1208. The filter layers 1204, 1206 and 1208 generally correspond to filter layers 1104, 1106 and 1108 except that filter layer 1206 does not include extending leg portions 1144.

In filter apparatus 1202, a pair of spacer members 1246 are positioned between the first filter layer 1204 and the second filter layer 1206. The spacer members 1246 define the gap 1240 between the downstream face 1262 of first filter 1204 and the upstream face 1264 of the second filter 1206.

The spacer members 1246 may be secured to both the first filter layer 1204 and second filter layer 1206 to seal the gap 1240 and prevent air from flowing out the ends of the filter apparatus 1202. For instance, the spacer members 1246 may be adhered to both the first filter layer 1204 and second filter layer 1206. Alternatively, the spacer members 1246 may be frictionally or otherwise secured to the first filter layer 1204 and second filter layer 1206. For example, the spacer members 1246 may be elastic and may be secured to the second filter layer 1206 in a state of tension to provide a seal between the spacer members 1246 and the second filter layer 1206. Alternately the spacer members may be held in place by a compressive force applied when first filter layer 1204 is positioned over the second filter layer 1206.

In some examples, the first filter layer 1204, second filter layer 1206 and spacer elements 1246 may be provided as a unitary upstream filter component for filter apparatus 1202. This may facilitate interchanging the upstream and intermediate filter elements as a user would not be required to align and secure the spacer elements 1246 when replacing the filters in filter apparatus 1202.

Figure 13:
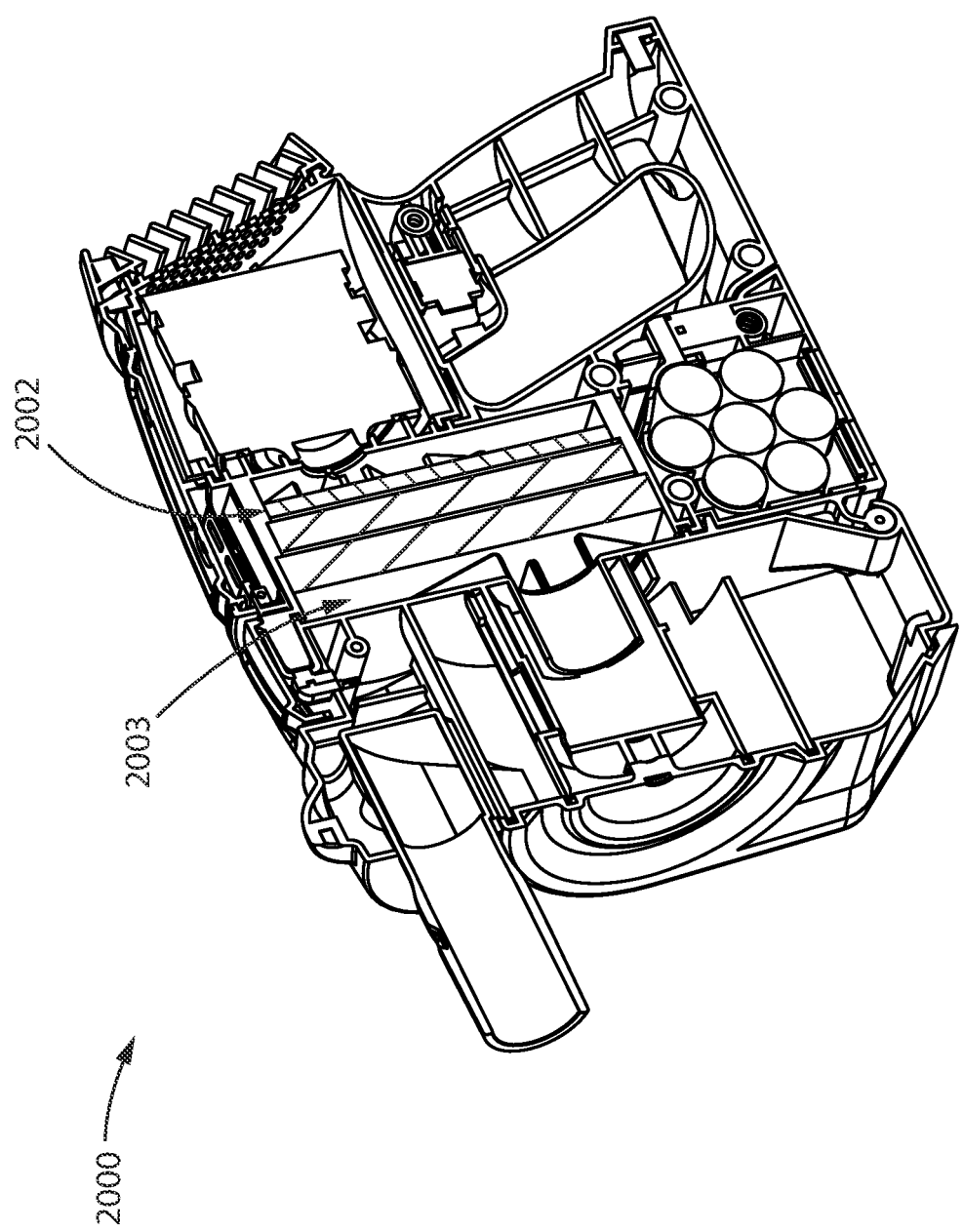
FIG. 13 is a perspective illustration of a cross-section of an exemplary surface cleaning apparatus comprising a fourth example embodiment of a filter apparatus.
Figure 14:
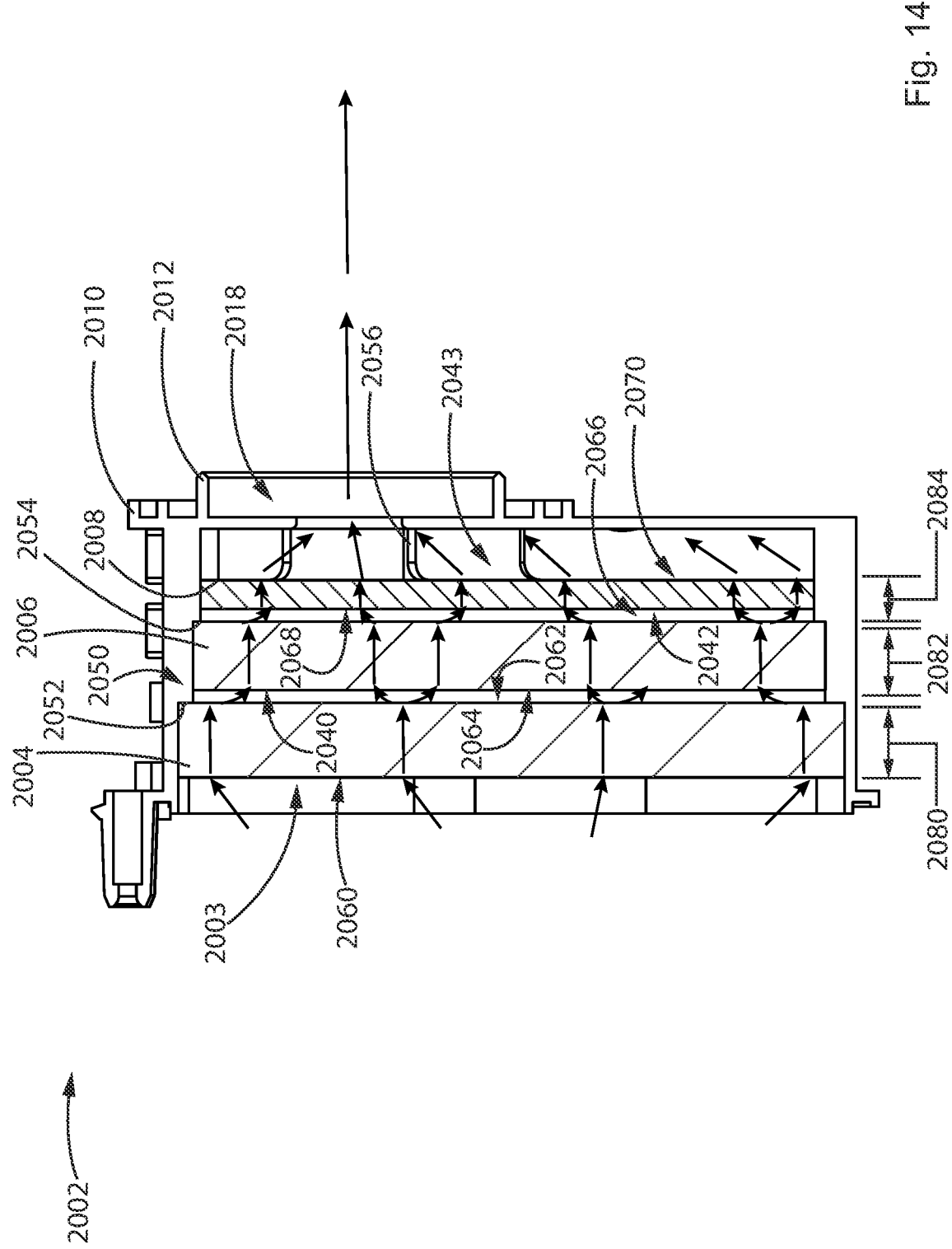
FIG. 14 is a cross-section of the filter apparatus of FIG. 13.

FIGS. 13 and 14 exemplify an alternative example of a surface cleaning apparatus 2000 with a fourth embodiment of a filter apparatus 2002. The filter apparatus 2002 is generally similar in operation to filter apparatuses 1102 and 1202, except that the filters 2004, 2006 and 2008 are planar rather than cylindrical or annular and may be disc shaped in a direction transverse to air flow therethrough.

As shown in FIGS. 13 and 14, the first planar filter 2004, second planar filter 2006 and third planar filter 2008 are arranged in sequence such that air flows from the upstream surface 2060, through filters 2004, 2006, 2008 and out the downstream surface 2070 and through outlet conduit 2018.

In the filter apparatus 2002, a filter support member 2012 provides a portion of the filter housing 2010. The filter support member 2012 also includes stepped sidewalls 2050 onto which the first filter 2004 and second filter 2006 are mounted. The steps/shoulders of the sidewalls 2050 are configured to define the gaps 2040 and 2042.

The first upstream step 2052 provides a seat for the first filter 2004 while the second step 2054 provides a seat for the second filter 2006. The first step 2052 is spaced apart from the second step 2054 by a distance greater than the diameter 2082 of the second filter 2006. Accordingly, the gap 2040 is defined between the downstream face 2062 of the first filter 2004 and the upstream face 2064 of the second filter 2006.

In the example shown, the third filter 2008 is mounted on a series of support projections 2056. The support projections 2056 define an outlet gap 2043 between the downstream face 2070 of the third filter 2008 and the outlet conduit 2018. The diameter 2084 of the third filter 2008, sidewalls 2050 and support projections 2056 are configured to define the gap 2042 between the downstream face 2066 of the second filter 2006 and the upstream face 2068 of the third filter 2008.

Preferably, the thickness 2080 of the first filter 2004 may be between about 75% and 125% of the thickness 2082 of the second filter 2006, and the thickness 2084 of the third filter 2008 may be between about 75% and 125% of the thickness 2082 of the second filter 2006. In the example shown in FIGS. 13-14, the thickness 2080 and 2082 of the first filter 2004 and second filter 2006 are generally the same, while the thickness 2084 of the third filter 2008 is smaller. Alternatively, the thickness of the first, second and third physical filter medias may be generally the same.

A header 2003 is also provided in the airflow passage upstream from the upstream surface 2060 of the first filter 2004. The header 2003 and filter housing 2010 direct all air flowing through the air flow path at a location immediately upstream of the first filter header through the first physical filter media.

It will be appreciated that the filter assembly of FIGS. 13 and 14 may use two filter media layers or more than 3 filter media layers. It will be appreciated that, as discussed previously, additional spacing elements (which may be formed as part of a filter or which may be separate spacer members) may be provided across the surface area of the filters.

FIGS. 15 and 16 exemplify a fifth example embodiment of a filter apparatus 2102 in another example surface cleaning apparatus 2100. The filter apparatus 2102 generally corresponds to filter apparatus 2002 except that the filter support member 2112 is not stepped.

In filter apparatus 2102, the second filter 2106 has a pair of extending legs 2144 at either end of the second filter 2106 similar to the legs 1144 of the second filter 1106 in filter apparatus 1102. In filter apparatus 2102, the third filter 2108 also has a pair of extending legs 2148 at either end. The legs 2144 define the gap 2140 between the downstream face 2162 of the first filter 2104 and the upstream face 2164 of the second filter 2106. The legs 2148 define the gap 2142 between the downstream face 2166 of the second filter 2106 and the upstream face 2168 of the third filter 2108.

Alternatively, separate spacer elements that extend between opposed spaced apart faces of adjacent filters (similar to spacer members 1246) may be provided between the first filter 2104 and second filter 2106 and/or between second filter 2106 and the third filter 2108 to define the gaps 2140 and 2142 respectively. Alternatively, the sidewalls 2150 may include projections that define gaps between the filters 2104, 2106 and 2108.

It will be appreciated that the filter assembly of FIGS. 15 and 16 may use two filter media layers or more than 3 filter media layers.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A surface cleaning apparatus having an air flow path from a dirty air inlet to a clean air outlet and including an air treatment member, a suction motor and a filter assembly provided in the air flow path, the filter assembly comprising:

a) a first longitudinally extending annular physical filter media having an upstream face and a downstream face;

b) a second longitudinally extending annular physical filter media having an upstream face and a downstream face, wherein the upstream face of the second annular physical filter media is positioned interior the first annular physical filter media whereby the upstream face of the second annular physical filter media faces the downstream face of the first annular physical filter media, wherein the first and second longitudinally extending annular physical filter media are discrete elements that are separable from each other; and, c) a longitudinally extending gap located between the upstream face of the second annular physical filter media and the downstream face of the first annular physical filter media, the gap having first and second longitudinally spaced apart ends wherein the first and second longitudinally spaced apart ends are closed whereby prior to passing through the second longitudinally extending annular physical filter media, air travels through the first longitudinally extending annular physical filter media, wherein the first longitudinally extending annular physical filter media is maintained in position with respect to the second longitudinally extending annular physical filter media by a compressive force applied by the first longitudinally extending annular physical filter media when the first longitudinally extending annular physical filter media is positioned overlying the second longitudinally extending annular physical filter media.

2. The surface cleaning apparatus of claim 1 wherein the filter assembly is a pre-motor filter.

3. The surface cleaning apparatus of claim 1 wherein the filter assembly is removable from the surface cleaning apparatus as a unit.

4. The surface cleaning apparatus of claim 1 wherein the first annular physical filter media is mounted in a filter housing and the filter housing has an absence of a by-pass passage.

5. The surface cleaning apparatus of claim 4 further comprising an upstream first filter header and the filter housing and the first filter header direct all air flowing through the air flow path at a location immediately upstream of the first filter header through the first annular physical filter media.

6. The surface cleaning apparatus of claim 1 wherein the first annular physical filter media provides the only air passage from a location immediately upstream of the first annular physical filter media to a location downstream of the first annular physical filter media.

7. The surface cleaning apparatus of claim 1 wherein each of the first and second annular physical filter media have an average pore size and the average pore size of the second annular physical filter media is smaller than the average pore size of the first annular physical filter media.

8. The surface cleaning apparatus of claim 7 wherein the first annular physical filter media comprises foam and the second annular physical filter media is selected from the group consisting of felt, electret and foam.

9. The surface cleaning apparatus of claim 1 wherein each of the first and second annular physical filter media has a diameter and the diameter of the first annular physical filter media is up to 25% larger than the diameter of the second annular physical filter media.

10. The surface cleaning apparatus of claim 1 wherein each of the first and second annular physical filter media has a cross-sectional area in a direction transverse to air flow therethrough and the cross-sectional area of the first annular physical filter media is up to 25% larger than the cross-sectional area of the second annular physical filter media.

11. The surface cleaning apparatus of claim 1 further comprising a third annular physical filter media having an upstream face and a downstream face, wherein the upstream face of the third annular physical filter media is positioned interior the second annular physical filter media whereby the upstream face of the third annular physical filter media faces the downstream face of the second annular physical filter media.

12. The surface cleaning apparatus of claim 11 wherein the third annular physical filter media has an average pore size and the average pore size of the third annular physical filter media is smaller than the average pore size of the second annular physical filter media.

13. The surface cleaning apparatus of claim 12 wherein each of the first and second annular physical filter media comprises foam and the third annular physical filter media is selected from the group consisting of felt, electret and foam.

14. The surface cleaning apparatus of claim 12 wherein the first annular physical filter media comprises foam and the second annular physical filter media is selected from the group consisting of felt, electret and foam.

15. The surface cleaning apparatus of claim 11 wherein each of the first, second and third annular physical filter media has a diameter and the diameter of the first annular physical filter media is up to 25% larger than the diameter of the second annular physical filter media, and the diameter of the third annular physical filter media is up to 25% larger than of the diameter of the second annular physical filter media.

16. The surface cleaning apparatus of claim 11 wherein each of the first, second and third annular physical filter media has a cross-sectional area in a direction transverse to air flow therethrough and the cross-sectional area of the first annular physical filter media is up to 25% larger than the cross-sectional area of the second annular physical filter media, and the cross-sectional area of the third annular physical filter media is up to 25% larger than the cross-sectional area of the second annular physical filter media.

17. A surface cleaning apparatus having an air flow path from a dirty air inlet to a clean air outlet and including an air treatment member, a suction motor and a filter assembly provided in the air flow path, the filter assembly comprising:

a) a first discrete physical filter media having an upstream face and a downstream face; and, b) a second discrete physical filter media having an upstream face and a downstream face, wherein the first discrete physical filter media extends around the second discrete physical filter media and wherein the filter assembly inhibits air bypassing the first discrete physical filter media as the air travels to the second discrete physical filter media, and wherein a compressive force produced by the first and second discrete filter media maintains the first discrete physical filter media in position with respect to the second discrete physical filter media.

18. The surface cleaning apparatus of claim 17 wherein the upstream face of the second discrete physical filter media is spaced from and faces the downstream face of the first discrete physical filter media.

19. The surface cleaning apparatus of claim 17 wherein each of the first and second discrete physical filter media has a diameter and the diameter of the first discrete physical filter media is up to 25% larger than the diameter of the second discrete physical filter media.

20. The surface cleaning apparatus of claim 17 wherein each of the first and second discrete physical filter media have an average pore size and the average pore size of the second discrete physical filter media is smaller than the average pore size of the first discrete physical filter media.

* * * * *